(12) United States Patent
Sample et al.

(10) Patent No.: US 10,460,427 B2
(45) Date of Patent: Oct. 29, 2019

(54) CONVERTING IMAGERY AND CHARTS TO POLAR PROJECTION

(71) Applicant: The Government of the United States of America, as represented by the Secretary of the Navy, Arlington, VA (US)

(72) Inventors: John T. Sample, Pearl River, LA (US); Elias Z. K. Ioup, New Orleans, LA (US); Bruce Y. Lin, New Orleans, LA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 231 days.

(21) Appl. No.: 15/821,303

(22) Filed: Nov. 22, 2017

(65) Prior Publication Data
US 2019/0156465 A1    May 23, 2019

(51) Int. Cl.
*G06T 5/00* (2006.01)
*G06T 3/00* (2006.01)
(Continued)

(52) U.S. Cl.
CPC .......... *G06T 5/006* (2013.01); *G06T 3/0031* (2013.01); *G06T 3/4053* (2013.01);
(Continued)

(58) Field of Classification Search
CPC .......... G06K 9/00617; G06K 9/0061; G06K 9/3233; G06K 9/4633
(Continued)

(56) References Cited

U.S. PATENT DOCUMENTS 6,829,391 B2 * 12/2004 Comaniciu ............ G06T 9/001
382/232
7,464,583 B1 * 12/2008 Kowalewski .......... G01Q 30/04
73/105

(Continued)

OTHER PUBLICATIONS

Snyder, J.P., "Map Projections—A Working Manual", U.S. Geological Survey Professional Paper 1395, United States Government Printing Office, Washington, 1987.
(Continued)

*Primary Examiner* — Yosef Kassa
(74) *Attorney, Agent, or Firm* — US Naval Research Laboratory; William P. Ladd (57) ABSTRACT

Embodiments relate to converting imagery to a polar projection. Initially, a map request that specifies the polar projection for a geographic area is obtained. The geographic area into a number of image regions. A first source image is obtained for a first image region, where the first source image is at a first target resolution, and a second source image is obtained for a second image region, where the second source image is at a second target resolution that is determined based on a geographic location of the second image region. The first source image and the second source image are projected into the polar projection to obtain a single output image. At this stage, a polar coordinate system that corresponds to the polar projection is used to render the single output image in a spatial map.

18 Claims, 8 Drawing Sheets

(51) Int. Cl.
*G06T 3/40* (2006.01)
*G06T 15/20* (2011.01)

(52) U.S. Cl.
CPC .. *G06T 15/205* (2013.01); *G06T 2207/10032* (2013.01); *G06T 2207/20221* (2013.01); *G06T 2207/30181* (2013.01)

(58) Field of Classification Search
USPC ............... 382/103, 109, 165, 190, 282, 284; 358/537, 538, 540
See application file for complete search history.

(56) References Cited

U.S. PATENT DOCUMENTS

| | | | | |
|---|---|---|---|---|
| 7,697,004 B2* | 4/2010 | Regelous | ................ | G06T 13/40 345/474 |
| 7,791,616 B2* | 9/2010 | Ioup | ................ | G06T 3/00 345/581 |
| 7,936,924 B2* | 5/2011 | Shi | ................ | G06K 9/3233 382/173 |
| 7,983,465 B2* | 7/2011 | Leroux | ................ | G06T 11/006 250/363.04 |
| 2007/0058865 A1* | 3/2007 | Li | ................ | G06K 9/4638 382/173 |

OTHER PUBLICATIONS

Jain, S., Barclay, T., "Adding the EPSG:4328 Geographic Longitude-Latitude Projection to Terra Server", Technical Report MSR-TR-2003-56, Microsoft Research, Redmond, WA, 2003, pp. 1-12.

Mesick, H.C., Ioup, E.Z.K., and Sample, J.T., "A Faster Technique for the Transformation of Universal Transverse Mercator Projected Raster Images into a Geodetic Projection", Naval Research Laboratory, NRL/MR/7440-05-8867, Mar. 11, 2005.

* cited by examiner

CONVERTING IMAGERY AND CHARTS TO POLAR PROJECTION

BACKGROUND

A geographic information system (GIS) is a system for capturing, storing, analyzing, and managing data and associated attributes, which are spatially referenced to the earth. More generically, a GIS is a tool (e.g., a computer system) that allows users to interact with geographically-referenced information. Spatially referenced features (e.g., countries, rivers, lakes, cities, etc.) can be rendered by a GIS to provide a user with an interactive map.

Coordinate systems are used as references for the locations of spatial features that are represented in a GIS. For any given location on the Earth and for a given map display and scale, one or many of the more than 300 geographic coordinate systems and more than 2,500 projected coordinate systems can be applied. A geographic coordinate system specifies a location on the Earth using three coordinates of a spherical coordinate system aligned with the sign axis of the Earth.

A projection is a two-dimensional representation of a three-dimensional area, and a projection may be implemented using any of the projected coordinate systems. The projected coordinate system defines one or more mathematical functions to translate the three-dimensional representation to a two-dimensional representation. For example, a projection may be used to represent the Earth, a three-dimensional object, as a planar surface such as a rendered map in a GIS.

Properties of the Earth's surface can be measured independent of their geography. Examples of properties include area, shape, direction, distance, and scale. Map projections can be configured to preserve one or more of these properties, though not all of them simultaneously. Each projected coordinate system and the resulting map projection, preserves, compromises, or approximates the basic properties in different ways. The purpose of the map, then, determines which projected coordinate system should be utilized to generate the map projection.

Figure 1:
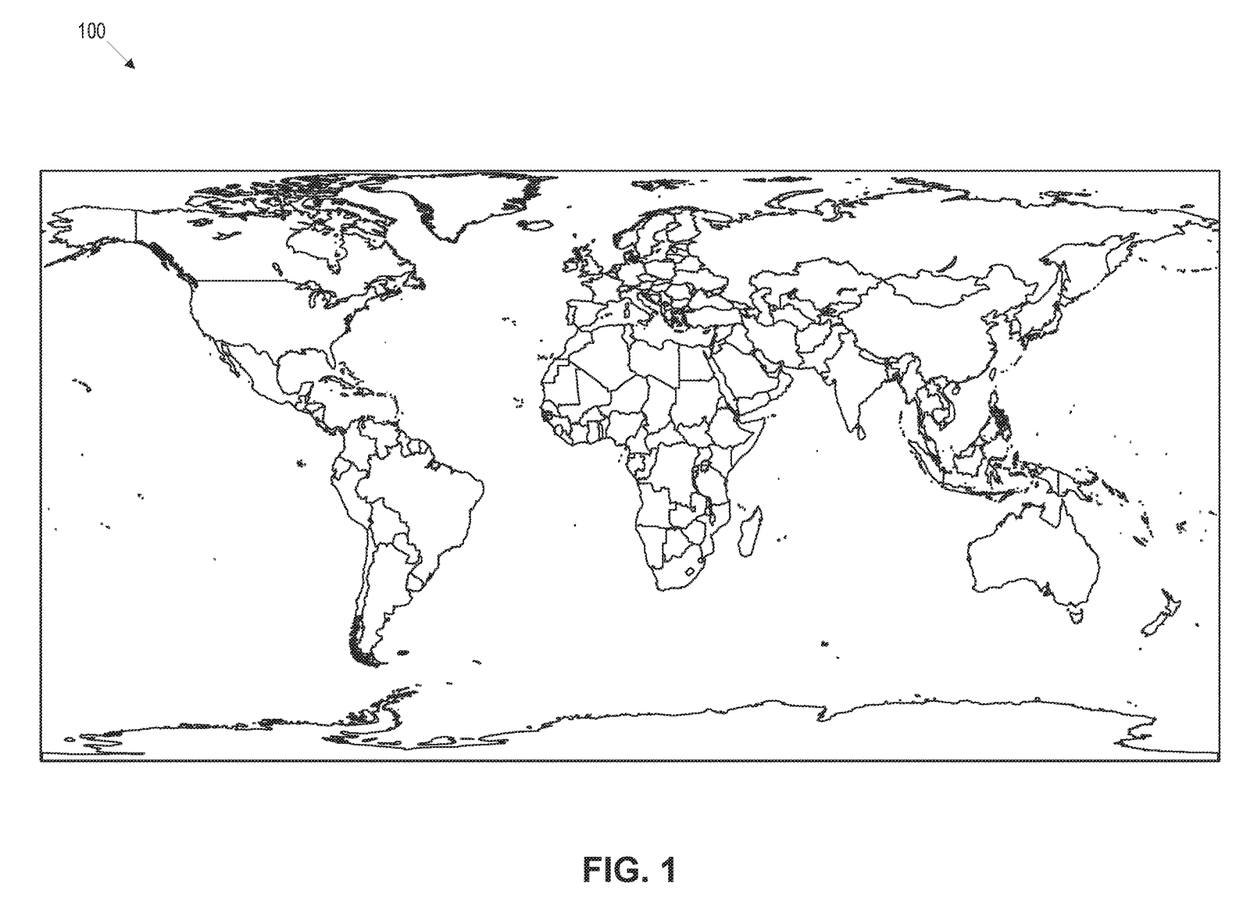
FIG. 1 shows a typical map projection 100 in the prior art.
Figure 2:
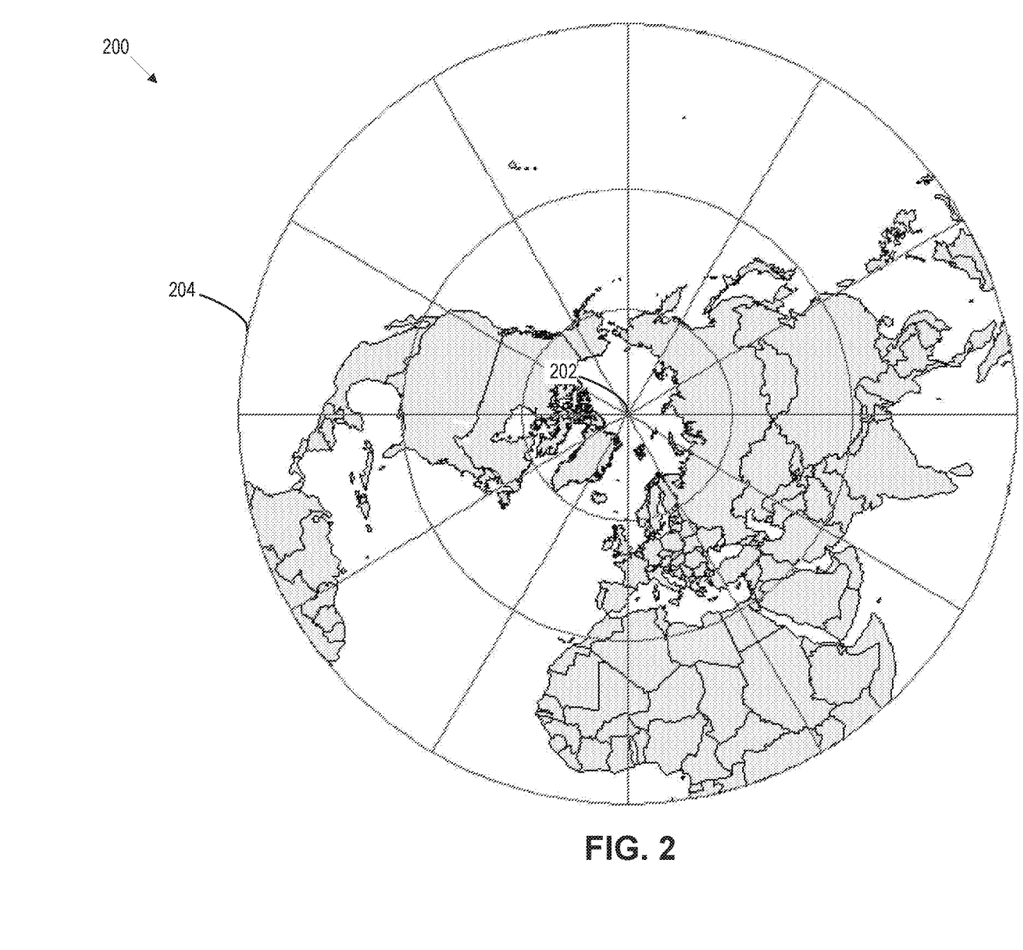
FIG. 2 shows a polar projection 200 in the prior art.

FIG. 1 shows a typical map projection 100. FIG. 2 shows a polar projection 200. Polar projections 200 are highly distorted and stretched for areas away from the pole. This distortion presents a problem for reprojection of imagery. A typical image reprojection process uses the following steps:
1. Acquire a source image at a resolution (i.e. number of pixels) that is close to the desired output image.
2. Create an empty output image.
3. For each pixel in the output image:
   a. Find the corresponding pixel location from the source image.
   b. Using an interpolation method, generate a new pixel value from the area surrounding the source location.
   c. Store that pixel value in the output image.

Once completed, a completely reprojected output image is obtained. The technique outlined above works well for most projections, even those with significant distortion; however, for polar projections this technique will create highly distorted projected imagery. In FIG. 2, the area in the center of the image is the North Pole 202. Outward from the center 202 are areas of lower latitude, and a result of the polar projection is that areas of lower latitude are stretched relative to areas around the center 202. Area stretching can be up to a factor of two for areas near the equator 204.

SUMMARY

Embodiments relate to converting imagery to a polar projection. Initially, a map request that specifies the polar projection for a geographic area is obtained. The geographic area into a number of image regions. A first source image is obtained for a first image region, where the first source image is at a first target resolution, and a second source image is obtained for a second image region, where the second source image is at a second target resolution that is determined based on a geographic location of the second image region. The first source image and the second source image are projected into the polar projection to obtain a single output image. At this stage, a polar coordinate system that corresponds to the polar projection is used to render the single output image in a spatial map.

DESCRIPTION

As discussed above, typical polar projections are highly distorted and imagery can becomes stretched and distorted beyond usability. Embodiments of the invention address this difficulty by providing a framework that allows map imagery and charts that are in a common projection to be properly reprojected into a polar projection.

Embodiments of the invention project imagery into a polar projection without distortion by projecting a series of image tiles at different scales rather than projecting from a single source image. Map imagery data sets (e.g., satellite imagery, chart maps such as topographical maps, etc.) are often stored as tiles, where each tile can covers the same dimensional area on a map. Typically, image tile sets are stored in successive series of higher resolution (i.e., scales). For example, a tile in scale 1 can be represented by four tiles in scale 2, where each of the four tiles is the same size as the original tile. In this example, the tiles in scale 2 have double the resolution as the tiles in scale 1. By using higher resolution imagery for locations farther from the pole, the distortion in the polar projected image for those areas is reduced.

Figure 3:
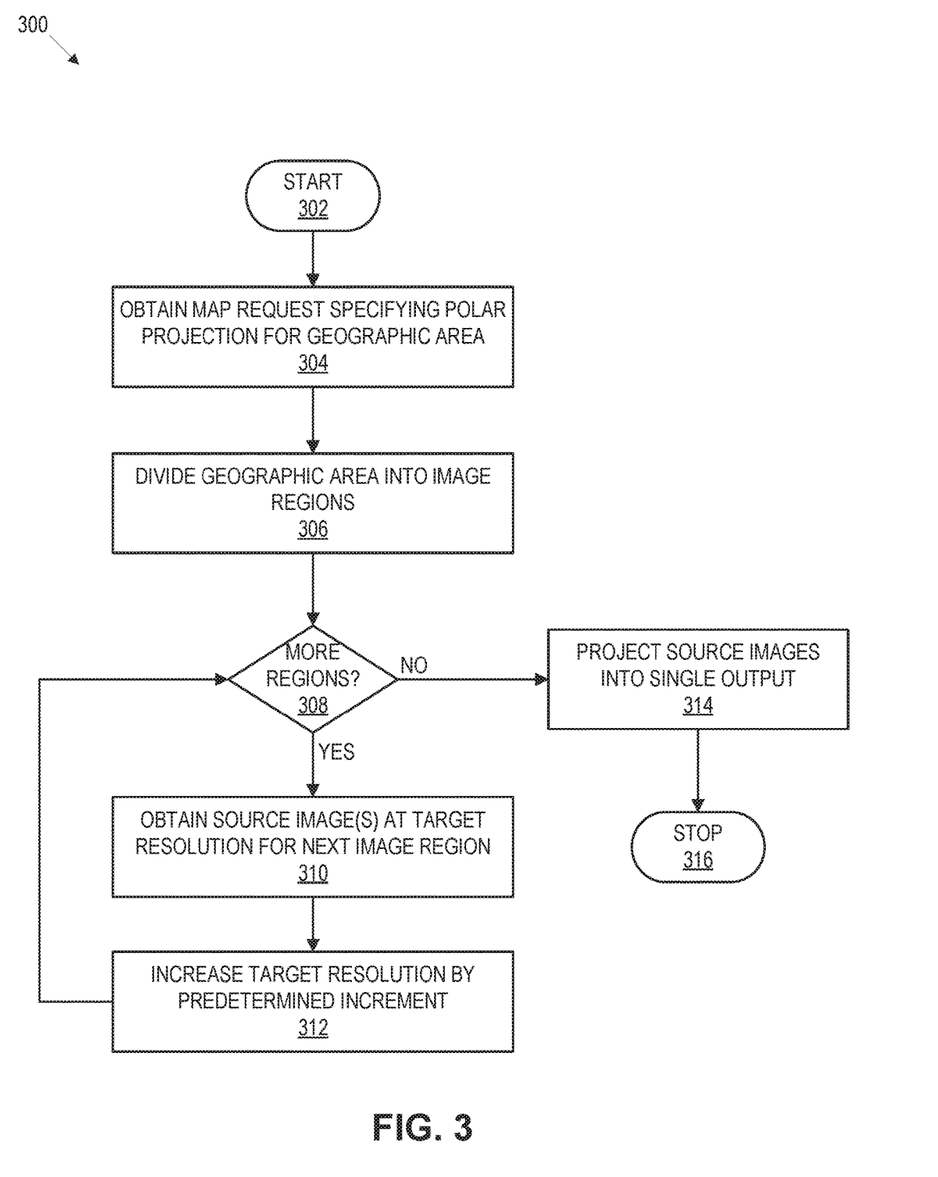
FIG. 3 is an example workflow for converting image bands to a polar projection.

FIG. 3 is an example workflow 300 for converting image bands to a polar projection. As is the case with the other processes described herein, various embodiments may not include all of the steps described below, may include additional steps, and may sequence the steps differently. Accordingly, the specific arrangement of steps shown in FIG. 3 should not be construed as limiting the scope of converting image bands to a polar projection.

In block 302, the workflow 300 starts and proceeds to block 304, where a map request is obtained that specifies a polar projection for a geographic area. For example, the map request can request a map that (1) has a specified bounds (i.e., geographic area), (2) includes specified imagery and spatial features, and (3) is in a selected polar projection. In block 306, the requested geographic area can be divided into image regions. For example, the image regions may be based on latitudes (e.g., image region 1 existing from latitude 90° N to 60° N, etc.). In this example, each image region can be associated with a target resolution of imagery.

In block 308, a determination is made as to whether there are more image regions to process. If there are more image regions to process, a source image (or images) at the target resolution is obtained for the next image region 310. As described above, the imagery (e.g., satellite imagery, chart maps such as topographical maps, etc.) may be stored in a spatial database as image bands of various resolutions. In some cases, the spatial database can be queried to identify an image layer with a resolution that is closest to the target resolution. In block 312, the target resolution is increased for processing the next image region. In some cases, the target resolution can be increased incrementally according to a preconfigured value. In other cases, a sequence of target resolutions can be stored, for example, in a database and used to determine the next target resolution.

Workflow 300 then returns to block 308 to determine if there are additional image regions to process. If there are no additional image regions to process, the obtained source images are projected into a single output in the polar projection in block 314. The single output can then be used to generate a map that can be provided in response to the map request. Workflow 300 can then proceed to block 316 and stop.

Figure 4:
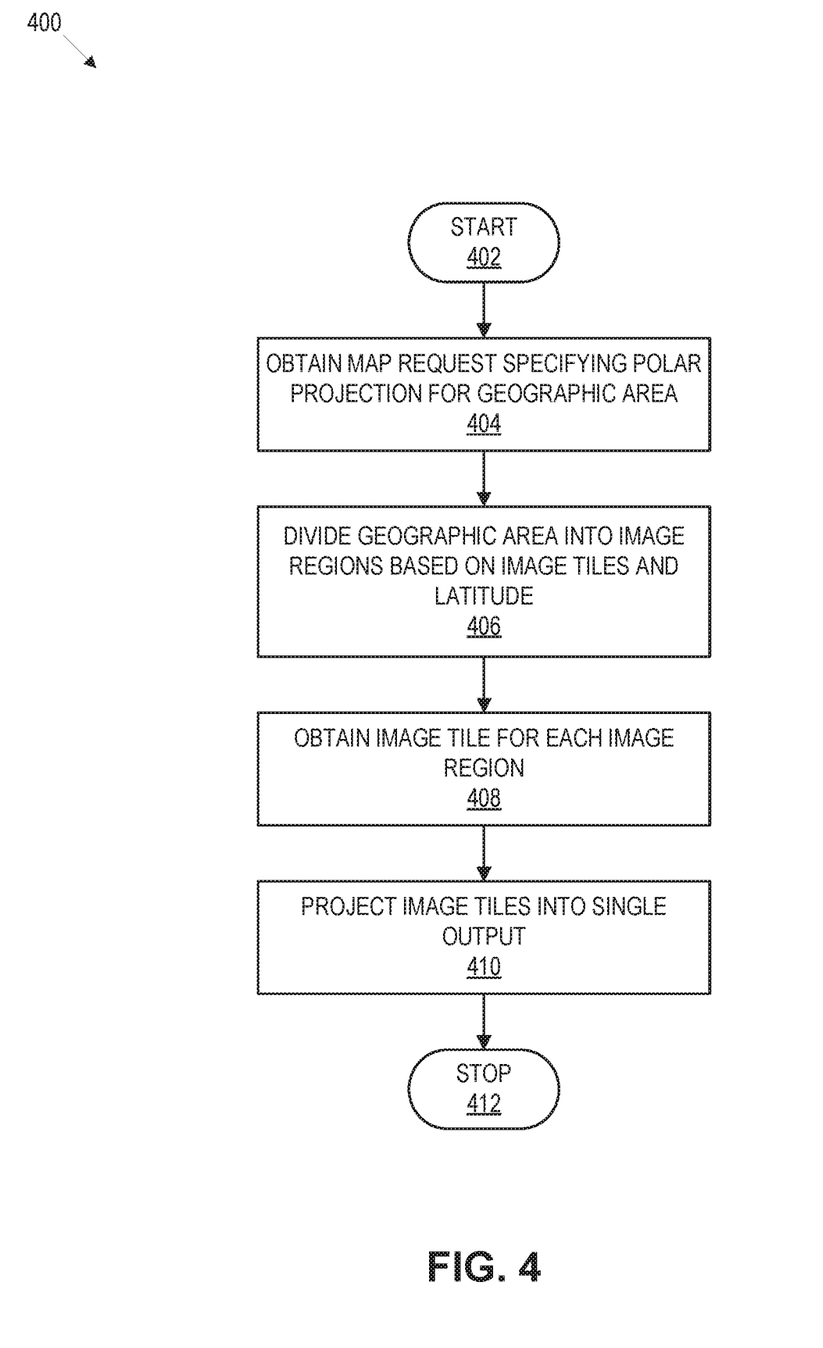
FIG. 4 is an example workflow for converting image tiles to a polar projection.

FIG. 4 is an example workflow 400 for converting image tiles to a polar projection. As is the case with the other processes described herein, various embodiments may not include all of the steps described below, may include additional steps, and may sequence the steps differently. Accordingly, the specific arrangement of steps shown in FIG. 4 should not be construed as limiting the scope of converting image tiles to a polar projection.

In block 402, the workflow 400 starts and proceeds to block 404, where a map request is obtained that specifies a polar projection for a geographic area. In block 406, the requested geographic area can be divided into image regions based on latitude and image tiles. For example, each range of latitudes can be associated with a different set of image tiles. In this example, the corresponding image tiles of each range are used to determine the image regions of the geographic area (e.g., region closest to the pole has large image regions because it uses low resolution image tiles, next closest region has smaller image regions because it uses higher resolution image tiles, etc.).

In block 408, a corresponding image tile is obtained for each image region of the geographic area. In block 410, the obtained image tiles are projected into a single output in the polar projection. The single output can then be used to generate a map that can be provided in response to the map request. Workflow 400 can then proceed to block 412 and stop.

Figure 5:
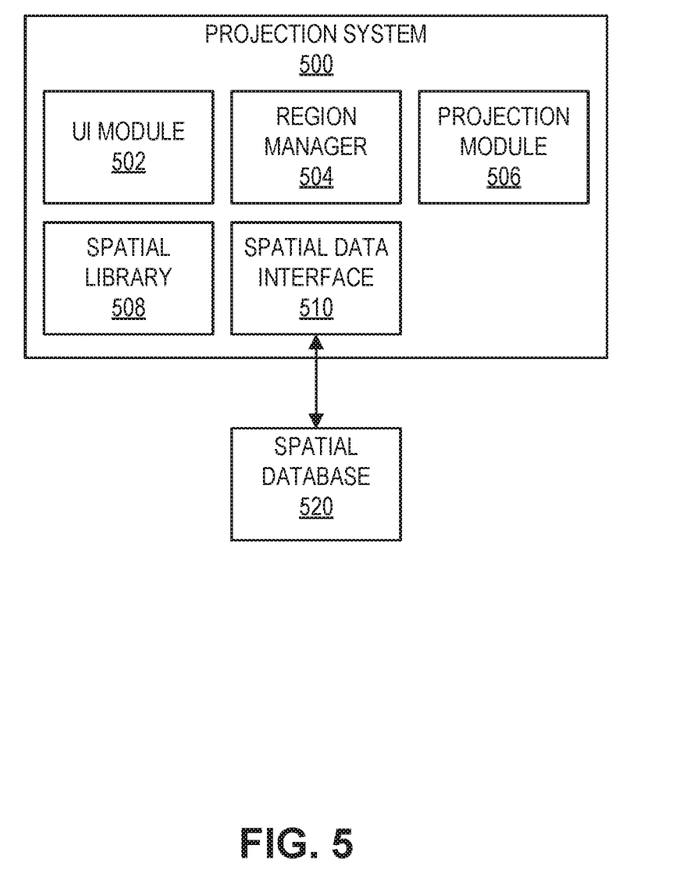
FIG. 5 is a diagram of an example system for converting imagery to a polar projection.

FIG. 5 is a diagram of an example system for converting imagery to a polar projection. The system of this example includes a projection system 500, and a spatial database 520.

Projection system 500 is configured to convert imagery to a polar projection in response to map requests. While FIG. 5 shows two databases, projection system 500 could be connected to any number of databases to convert imagery to a polar projection. Projection system 500 includes a UI module 502, a region manager 504, a projection module 506, a spatial library 508, and a spatial data interface 510.

UI module 502 provides a user interface that allows users to interact with projection system 500. For example, UI module 502 can provide a web-based map interface that allows users to generate and use GIS maps that include spatial features. In this example, the UI module 502 can allow a user to submit a map request for geospatial data to be rendered on a GIS map, where the map interface receives a specified bounds (i.e., geographic area), specified imagery and spatial features, and a selected polar projection, etc. as parameters from the user.

Region manager 504 divides geographic areas according to region rules. Region manager 504 can allow a user via the UI module 502 to specify the region rules (e.g., latitude ranges, associated image tiles, etc.). Region manager 504 can receive a geographic area and selected region rules as input and provide image regions as output, where each image region is associated with an image band or image tile.

Projection module 506 projects imagery and spatial features into specified projections. For example, the projection module 506 can receive image regions, associated imagery, and a selected projection as input and provide a combined projected image in the selected projection as output. Polar projections that are centered on either the North or South Pole are used throughout the examples described herein. For a North Pole projection, higher resolution imagery should be used for image regions that are farther south and vice versa.

Spatial library 508 is configured to perform spatial operations on imagery and geospatial features. For example, spatial library 508 can be used by projection module 506 to combine imagery before or after being projected. In another example, spatial library 508 can be used by region manager 504 to divide a geographic area into image regions.

Spatial data interface 510 allows projection system 500 to access spatial database 520. For example, spatial data interface 510 can be database drivers that provide access to a database backend that includes spatial database 520. Different spatial interfaces 510 can be implemented to support different types of spatial features (e.g., vector features, points of interest, etc.) and imagery (e.g., satellite images, topographical maps, etc.). In this manner, the implementation of projection system 500 is independent of the type of spatial data/imagery.

Spatial database 520 can include any number of spatial data layers. In some cases, spatial database 520 can include metadata for spatial data that is stored at remote locations. Each spatial data layer may be in a source coordinate system, which can be used to perform projections of the corresponding spatial data.

Figure 6A:
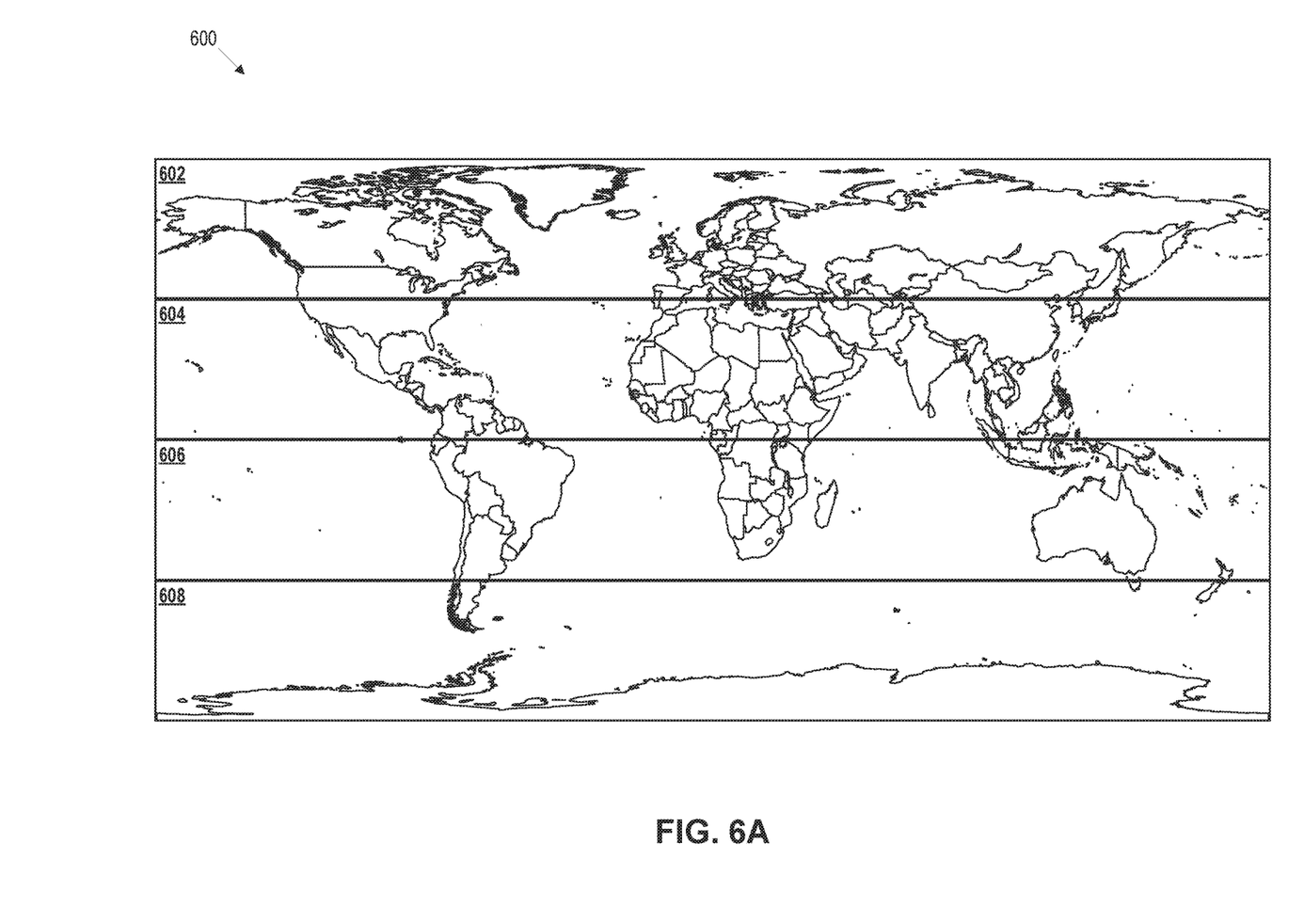
FIG. 6A is an example map with image bands for converting to a polar projection.

FIG. 6A is an example map 600 with image bands 602-608 for converting to a polar projection. Image band A 602 has the lowest resolution because it is the nearest to the North Pole. For example, image band A 602 may be 1000 pixels wide and 100 pixels tall. In this example, image band B 604 may be 1200 pixels wide and 120 pixels tall, image band C 606 may be 1500 pixels wide and 150 pixels tall, and image band D 608 may be 2000 pixels wide and 200 pixels tall. The higher resolution of the image bands farther from the North Pole compensate for the stretching in those regions when the imagery is projected into a polar projection, which decreases the distortion of the output image. In this example, four image bands are shown; however, any number of image bands of varying resolution could be used.

Map scale is the ratio of map units to actual units on the earth. For example, a map can have a scale of 1:100,000 such that 1 inch on the map corresponds to 100,000 inches on the earth. However, map scale is not static and can vary in a map depending on the projection and distortions caused by a projection. In a polar projection, the map scale is larger further from the center because the regions further from the center are stretched and distorted. The principal scale of a projection is the target scale of the projection, and for a polar projection, the principal scale occurs at the centered pole of the polar projection. In this case, scale factor refers to the local scale of a region divided by the principal scale. For example, a polar projection can have a principal scale of 1:100,000, and a geographic region far from the pole can have a local scale of 1:85,000. In this example, the scale factor would be 1.18.

The target resolution for each of the image bands 602 in FIG. 6A may be determined based on the scale factor of the map. Image band A 602 can have a target resolution that is proportional to the scale factor a latitude in image band A 602, and so on for the subsequent image bands 604-608. In this manner, the target resolution of the image bands 602-608 can proportionally account for the magnitude of distortion at those latitudes.

Figure 6B:
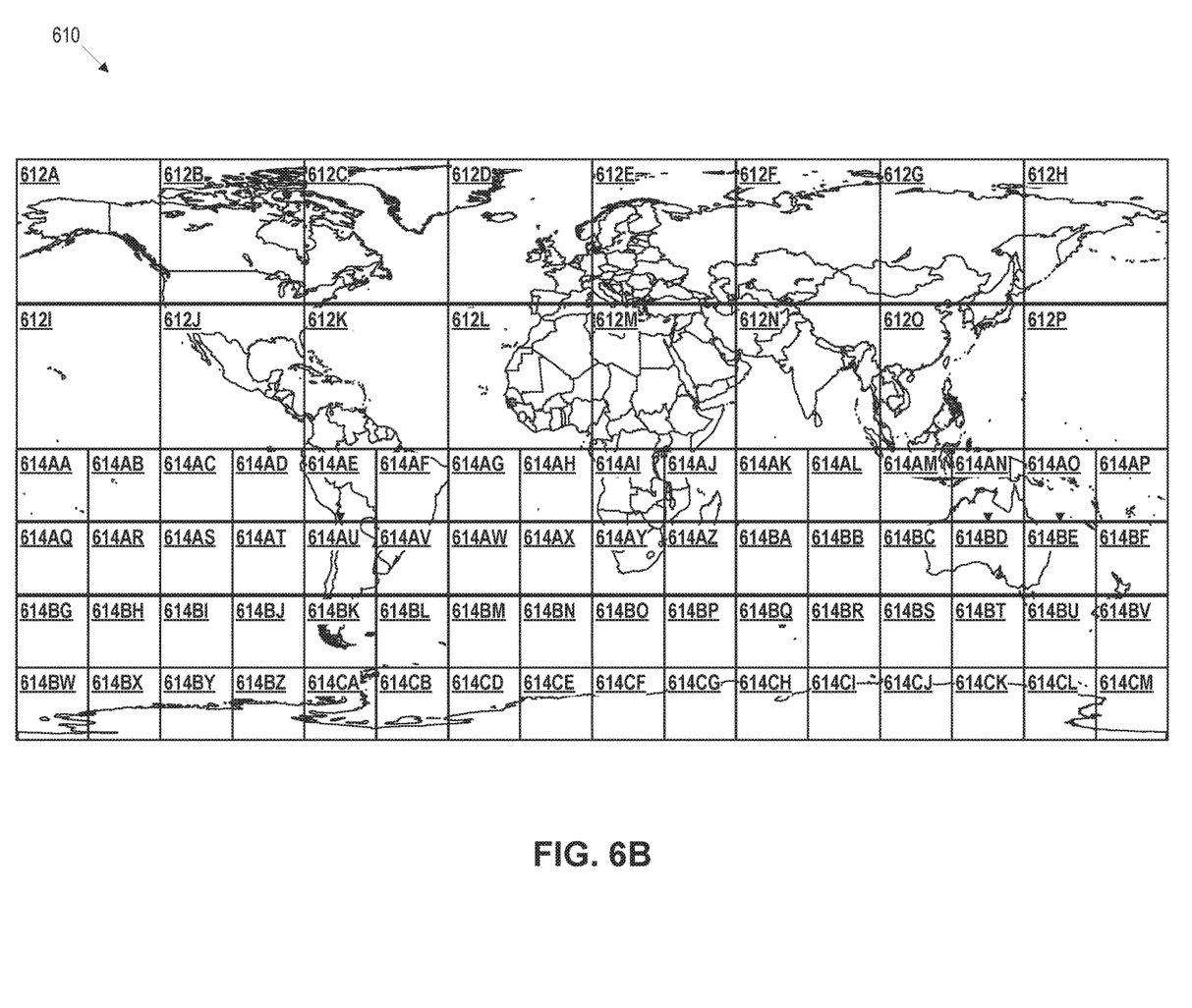
FIG. 6B is an example map with image tiles for converting to a polar projection.
Figure 7:
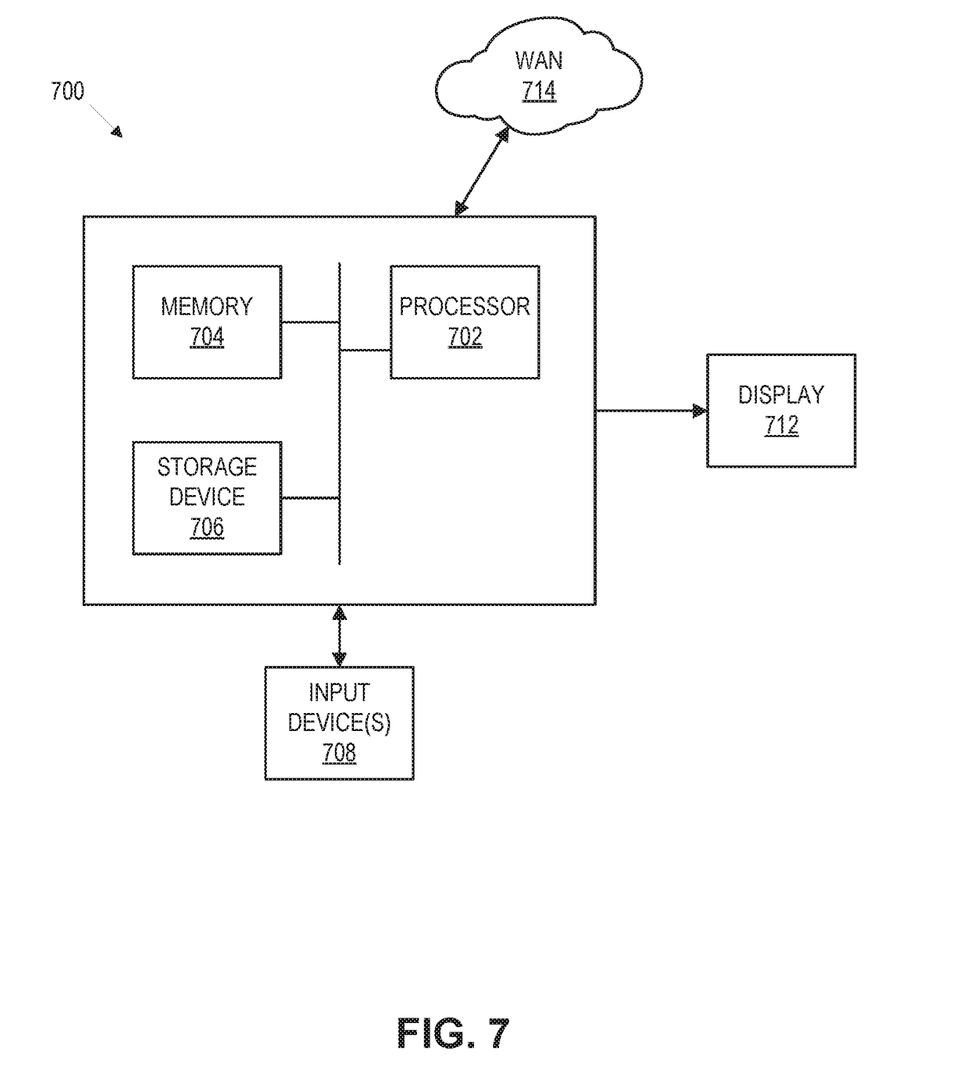
FIG. 7 is a diagram of an example computer system for converting imagery to a polar projection.

FIG. 6B is an example map 610 with image tiles for converting to a polar projection. The first set of image tiles 612A-612P have the lowest resolution because they are the nearest to the North Pole, which is the center of a polar projection. Each of the first set of image tiles 612A-612P covers four times the geographic area as each of the second set of image tiles 614AA-614CM; however, the image tiles of both sets have the same amount of detail (i.e., resolution). In other words, each of the second set of image tiles 614AA-614CM has double the resolution of each of the first set of image tiles 612A-612P. The higher resolution of the image tiles farther from the North Pole compensate for the stretching in those regions when the imagery is projected into a polar projection The invention may be implemented on virtually any type of computer regardless of the platform being used. For example, as shown in FIG. 7, a computer system 700 includes a processor 702, associated memory 704, a storage device 706, and numerous other elements and functionalities typical of today's computers (not shown). The computer 700 may also include input means 708, such as a keyboard and a mouse, and output means 712, such as a monitor. The computer system 700 may be connected to a local area network (LAN) or a wide area network (e.g., the Internet) 714 via a network interface connection (not shown). Those skilled in the art will appreciate that these input and output means may take other forms.

Further, those skilled in the art will appreciate that one or more elements of the aforementioned computer system 700 may be located at a remote location and connected to the other elements over a network. Further, the invention may be implemented on a distributed system having a plurality of nodes, where each portion of the invention (e.g., projection module, spatial library, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for converting imagery to a polar projection, comprising:
    obtaining a map request that specifies the polar projection for a geographic area;
    dividing the geographic area into a plurality of image regions;
    obtaining a first source image for a first image region of the plurality of image regions, wherein the first source image is at a first target resolution;
    obtaining a second source image for a second image region of the plurality of image regions, wherein the second source image is at a second target resolution that is determined based on a geographic location of the second image region;
    projecting the first source image and the second source image into the polar projection to obtain a single output image; and
    using a polar coordinate system that corresponds to the polar projection to render the single output image in a spatial map.

2. The method of claim 1, wherein each image region of the plurality of image regions is an image band that covers a different range of latitudes.

3. The method of claim 1, wherein the first source image is related to a first image tile of a first plurality of image tiles and the second source image is related to a second image tile of a second plurality of image tiles, wherein the second plurality of image tiles are higher resolution than the first plurality of image tiles.

4. The method of claim 3, wherein the second source image is a fourth as large as the first source image, and wherein the second target resolution is double the first target resolution.

5. The method of claim 1, wherein the first source image and the second source image are raster satellite images.

6. The method of claim 1, further comprising:
    obtaining a third source image for a third image region of the plurality of image regions, wherein the third source image is at a third target resolution that is determined based on a second geographic location of the third image region, and wherein the third source image is also projected into the polar project to obtain the single output image.

7. A system comprising:
    a spatial database to store a first source image and a second source image; and
    a computer processor to execute:
        a region manager to:
            divide a geographic area into a plurality of image regions;
            obtain the first source image for a first image region of the plurality of image regions, wherein the first source image is at a first target resolution;
            obtain the second source image for a second image region of the plurality of image regions, wherein the second source image is at a second target resolution that is determined based on a geographic location of the second image region;
        a projection module to project the first source image and the second source image into a polar projection to obtain a single output image; and
        a user interface module to:
            obtain a map request that specifies the polar projection for the geographic area; and use a polar coordinate system that corresponds to the polar projection to render the single output image in a spatial map.

8. The system of claim 7, wherein each image region of the plurality of image regions is an image band that covers a different range of latitudes.

9. The system of claim 7, wherein the first source image is related to a first image tile of a first plurality of image tiles and the second source image is related to a second image tile of a second plurality of image tiles, wherein the second plurality of image tiles are higher resolution than the first plurality of image tiles.

10. The system of claim 9, wherein the second source image is a fourth as large as the first source image, and wherein the second target resolution is double the first target resolution.

11. The system of claim 7, wherein the first source image and the second source image are raster satellite images.

12. The system of claim 7, wherein the region manager is further to obtain a third source image for a third image region of the plurality of image regions, wherein the third source image is at a third target resolution that is determined based on a second geographic location of the third image region, and wherein the third source image is also projected into the polar project to obtain the single output image.

13. A non-transitory computer-readable medium comprising executable instructions for converting imagery to a polar projection, the instructions when executed causing a computer processor to:
obtain a map request that specifies the polar projection for a geographic area;
divide the geographic area into a plurality of image regions;
obtain a first source image for a first image region of the plurality of image regions, wherein the first source image is at a first target resolution;
obtain a second source image for a second image region of the plurality of image regions, wherein the second source image is at a second target resolution that is determined based on a geographic location of the second image region;
project the first source image and the second source image into the polar projection to obtain a single output image; and
use a polar coordinate system that corresponds to the polar projection to render the single output image in a spatial map.

14. The non-transitory computer-readable medium of claim 13, wherein each image region of the plurality of image regions is an image band that covers a different range of latitudes.

15. The non-transitory computer-readable medium of claim 13, wherein the first source image is related to a first image tile of a first plurality of image tiles and the second source image is related to a second image tile of a second plurality of image tiles, wherein the second plurality of image tiles are higher resolution than the first plurality of image tiles.

16. The non-transitory computer-readable medium of claim 15, wherein the second source image is a fourth as large as the first source image, and wherein the second target resolution is double the first target resolution.

17. The non-transitory computer-readable medium of claim 13, wherein the first source image and the second source image are raster satellite images.

18. The non-transitory computer-readable medium of claim 13, wherein the instructions when executed further cause the computer processor to:
obtain a third source image for a third image region of the plurality of image regions, wherein the third source image is at a third target resolution that is determined based on a second geographic location of the third image region, and wherein the third source image is also projected into the polar project to obtain the single output image.

* * * * *